(12) United States Patent
  Moreau

(10) Patent No.: US 9,694,956 B2
(45) Date of Patent: Jul. 4, 2017

(54) DISPENSING AND MIXING DEVICE

(71) Applicant: Francoise Moreau, Gujan-Mestras (FR)

(72) Inventor: Francoise Moreau, Gujan-Mestras (FR)

( * ) Notice: Subject to any disclaimer, the term of this patent is extended or adjusted under 35 U.S.C. 154(b) by 68 days.

(21) Appl. No.: 14/466,476

(22) Filed: Aug. 22, 2014

(65) Prior Publication Data

US 2014/0361016 A1    Dec. 11, 2014

Related U.S. Application Data

(63) Continuation-in-part of application No. PCT/FR2013/000053, filed on Feb. 25, 2013.

(30) Foreign Application Priority Data

Feb. 23, 2012  (FR) ...................... 12 51678

(51) Int. Cl.
  *B65D 51/28*  (2006.01)
  *A23L 2/385*  (2006.01)
  *B65D 47/42*  (2006.01)
(52) U.S. Cl.
  CPC .............. *B65D 51/28* (2013.01); *A23L 2/385* (2013.01); *B65D 47/42* (2013.01); *B65D 51/2835* (2013.01)
(58) Field of Classification Search
  CPC .... B65D 47/42; B65D 51/28; B65D 51/2835; A23L 2/385
  USPC .......... 141/112, 322; 220/502, 521; 426/115
  See application file for complete search history.

(56) References Cited

U.S. PATENT DOCUMENTS

| 2004/0026422 A1* | 2/2004 | Westphal | ............ B65D 51/224 220/277 |
| 2009/0301905 A1* | 12/2009 | Bullard | .................... A61J 9/00 206/221 |
| 2010/0236952 A1 | 9/2010 | Masterson et al. | |
| 2011/0163119 A1* | 7/2011 | Nyambi | ............ B65D 51/2835 222/1 |

FOREIGN PATENT DOCUMENTS

| EP | 1819603 | 8/2007 |
| EP | 2239205 | 10/2010 |

(Continued)

OTHER PUBLICATIONS

International Search Report for International Application No. PCT/FR2013/000053 filed Feb. 25, 2013 on behalf of Francoise Moreau. Mail Date: Feb. 16, 2015. 12 pages. French original + English translation.

(Continued)

*Primary Examiner* — Timothy L Maust
*Assistant Examiner* — Andrew Schmid
(74) *Attorney, Agent, or Firm* — Steinfl + Bruno LLP

(57) ABSTRACT

A dispensing and mixing device designed to be fixed on an opening of a receiving container and adapted to receive an autonomous container having an opening closed by a closure film and containing an additive product to be dispensed into the interior space of the receiving container which contains a different product, is described. The device has a holding element adapted to receive and retain the autonomous container in the region of its opening, and an assembly element designed to be fixed on the opening of the receiving container and to receive said holding element by screwing.

30 Claims, 10 Drawing Sheets

(56) References Cited

FOREIGN PATENT DOCUMENTS

| JP | 2007062768 | 3/2007 |
| WO | 2006/037244 | 4/2006 |
| WO | 2009/140855 | 11/2009 |
| WO | 2011/046409 | 4/2011 |

OTHER PUBLICATIONS

Written Opinion for International Application No. PCT/FR2013/000053 filed Feb. 25, 2013 on behalf of Francoise Moreau. Mail Date: Feb. 16, 2015. 16 pages. French original + English translation.
International Preliminary Report on Patentability for International Application No. PCT/FR2013/000053 filed Feb. 25, 2013 on behalf of Francoise Moreau. Mail Date: Feb. 24, 2015. 18 pages. French original + English translation.

* cited by examiner

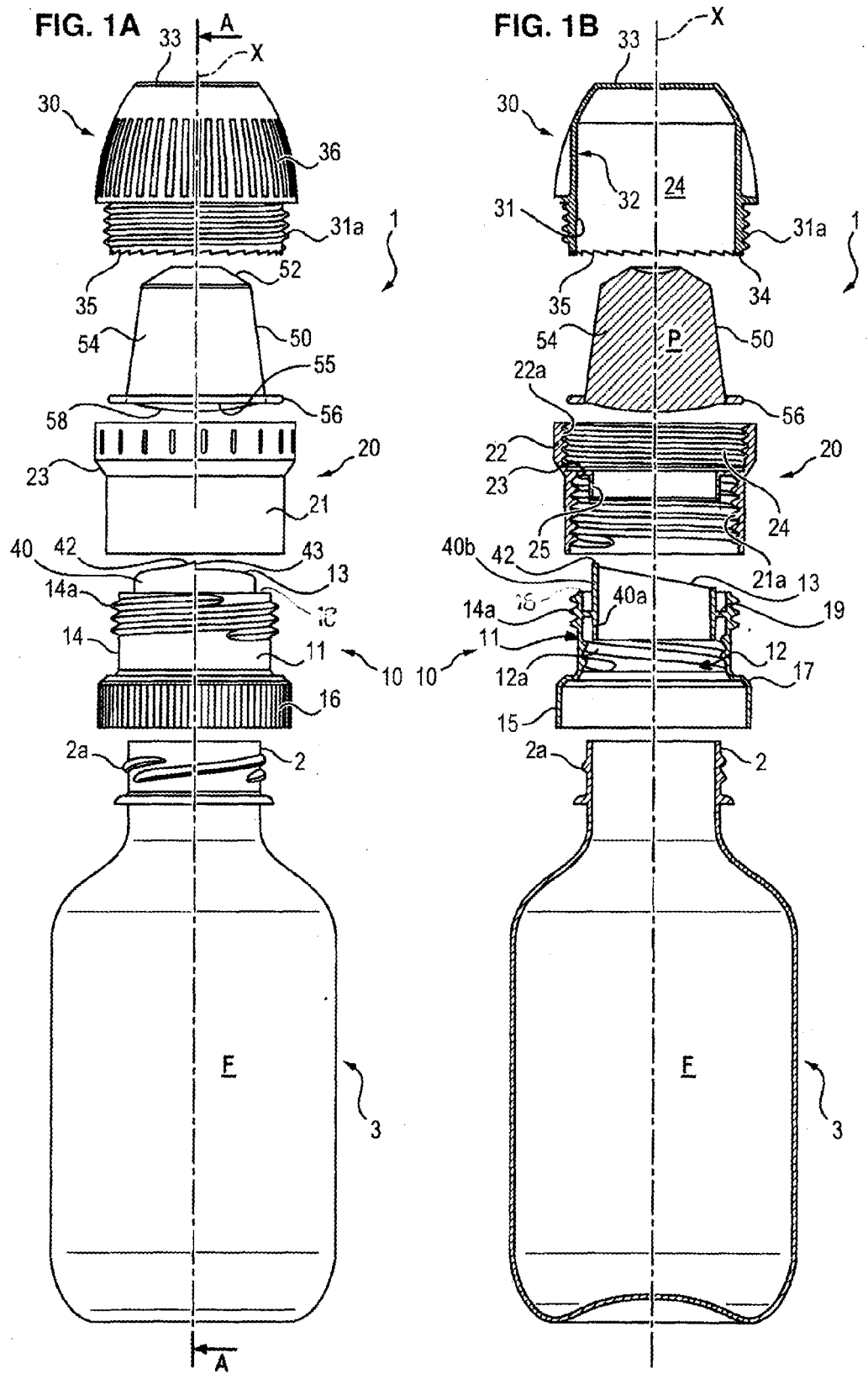

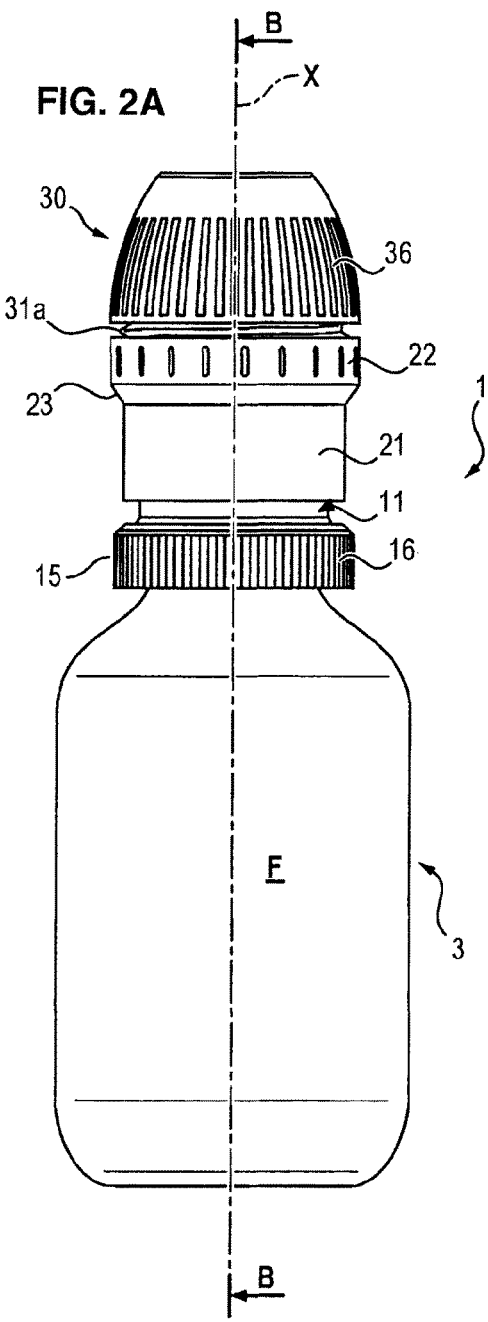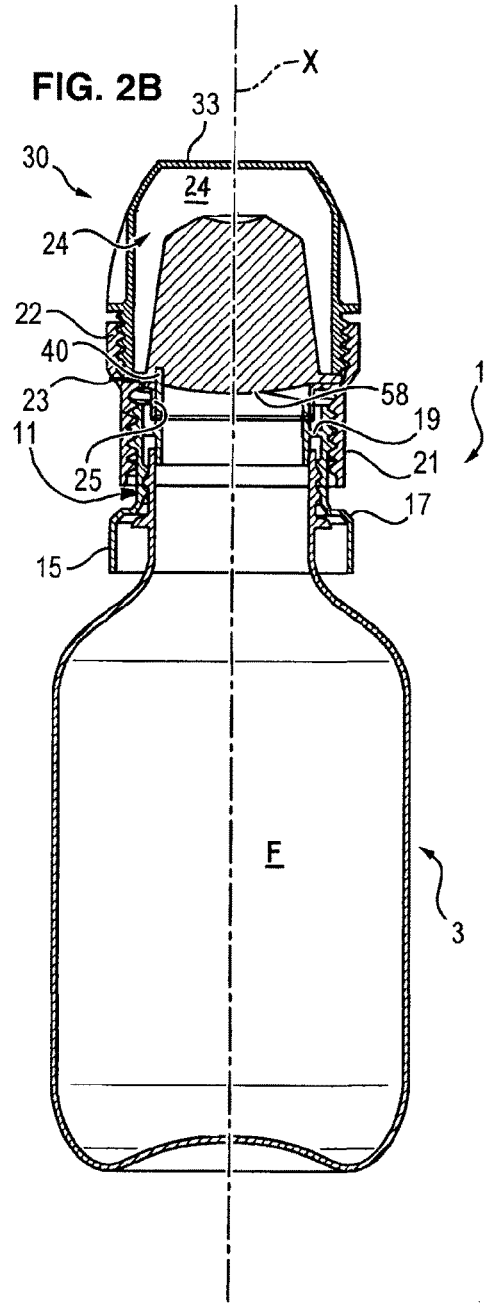

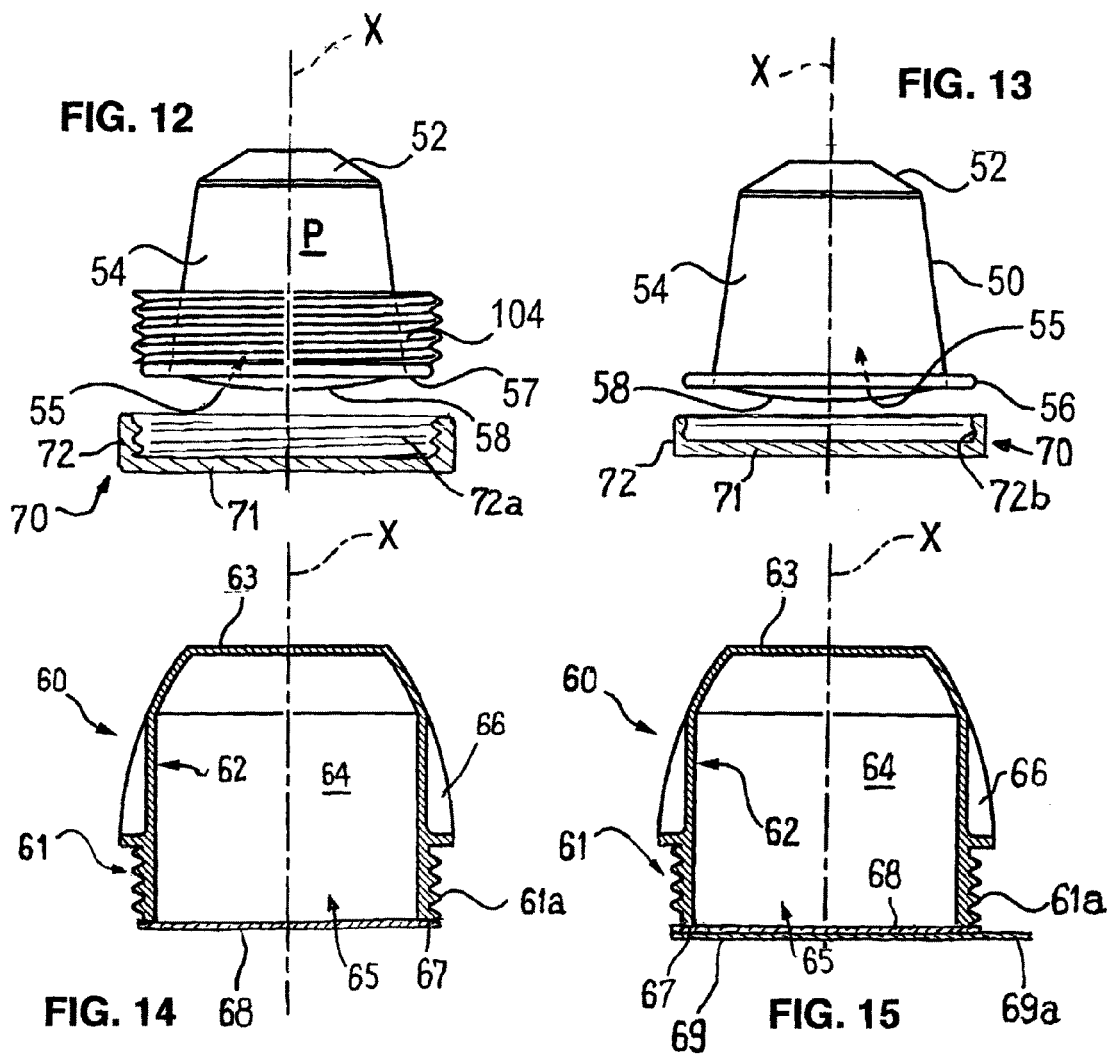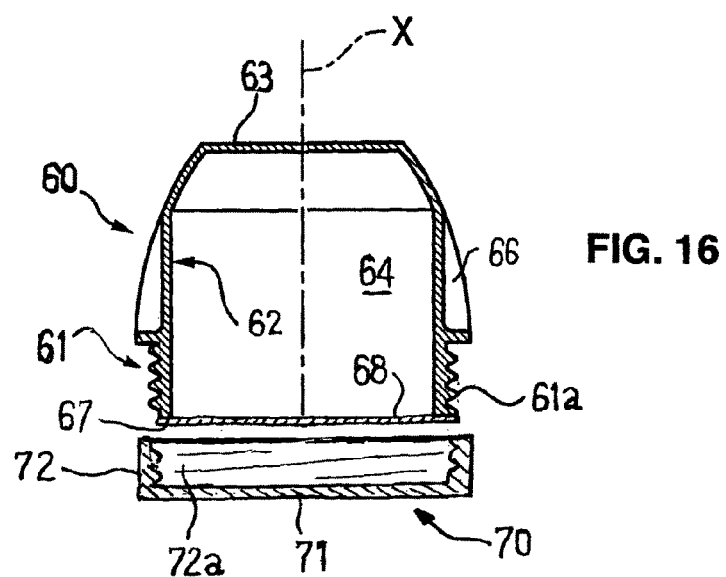

DISPENSING AND MIXING DEVICE

CROSS REFERENCE TO RELATED APPLICATIONS

The present application is a continuation in part (CIP) of PCT application PCT/FR2013/000053, filed on Feb. 25, 2013, which in turn claims priority to French Patent Application FR 1251678, filed on Feb. 23, 2012, which are both incorporated herein by reference in their entirety.

FIELD

The present disclosure generally relates to a dispensing and mixing device adapted for attachment to an opening of a container containing a first product (typically a liquid) and for dispensing and then mixing an add-on product contained in another container (such as a pod-type capsule or other containers), which is stand-alone and manufactured and filled distinctly with another product such as a liquid or powder.

BACKGROUND

Such dispensing devices are already known.

For example, document EP 2 239 205 describes a pre-dosing cap-like device comprising a reservoir intended to be attached to a bottle and having a back that can be perforated, as well as a puncturing element for puncturing the back of the reservoir and releasing the concentrate into the bottle by pressing on the device.

Since the add-on product is contained in the device itself, the system is for single use and cannot be easily adapted for making a device with a stand-alone container.

Disposable and sealed pod-type capsules are well known in the prior art, especially when used in the preparation of certain beverages, such as coffee, and are perforated with holes on both their back and their sealed opening permit pressurized hot water to be injected through the capsule, which is used like a filter without dispersing the contents, in order to brew the contents using an automatic electric machine.

The present disclosure applies to such disposable and sealed pod-type capsules and any other sealed container used to dose and store products, generally in a sealed manner, and intended to be opened for the purposes of dispensing their contents into another container and using said contents for making beverages or preparations by mechanically and manually associating different products or product mixtures.

The present disclosure specifically relates to the modalities for opening seals by permitting the mechanical opening of a seal applied by heat sealing to the opening of a container to release its contents without direct manual contact with the seal and the thus protected opening, while in general, a sealed or heat-sealed adhesive is manually removed from the container by pulling on its side tab or perforated and manually torn with a knife to release the contents of the container, and thus being in direct manual contact with the opening of the container serving as passage for its contents.

In particular, document EP 1 819 603 describes a closure device with a dispensing capsule adapted to be screwed onto the threaded neck of a bottle and comprising an attachment element intended to be screwed onto the neck and a cap adapted to be screwed onto the attachment element. The cap, which is double-walled, internally forms a chamber adapted for receiving a sealed capsule, which is blocked by the combination of a snap-fit on the inner wall of the cap and a bearing against an arrangement at the top of the cap, permitting the capsule to be released by pressure after use. The attachment element includes a cutting element extending toward the capsule and adapted for cutting the seal, as well as a retaining element to prevent the seal from dropping into the bottle after being cut.

However, this dispensing device has the disadvantage of being difficult to manufacture and assemble. Furthermore, the central configuration of the cutting device and the retaining element hinders the communication between the inside of the capsule and the inside of the bottle after opening, which can impede a satisfactory flow of products for complete mixing. In addition, the dispensing device hinders the pouring of the liquid once mixed, so it is preferable to remove it completely before dispensing. Finally, the retention of the capsule in the cap requires a very specific and precise geometric relationship between the capsule and the cap.

SUMMARY

The present disclosure aims at providing a dispensing and mixing device that has at least one of the following advantages:
- being reusable, with or without a cover,
- being simple to manufacture and use,
- allowing, after the mechanical opening of the sealing film, an instant and easy mixing together, without the interposition of obstacles, of the contents of a stand-alone pod-type capsule or pot or bottle or other container, with the preferably liquid contents of another bottle-type receiving container,
- allowing to directly pour the fluid once mixed, without being completely disassembled, so that the mixed products can be used or drunk, usually immediately.

To this end, the present disclosure provides a mixing and dispensing device adapted for attachment to an opening of a receiving container, and intended to receive a stand-alone container having an opening sealed with a sealing film and containing an add-on product to be dispensed into the interior of the receiving container containing another product F, the device comprising:
- a receiving element adapted to receive and retain the stand-alone container at its opening,
- a connecting element adapted for attachment to the opening of the receiving container and for receiving said receiving element by screwing, whereas said connecting element having a generally smooth and unobstructed passage part adapted for engagement into a homologous part of said receiving element, said passage part forming a spout and incorporating a member for opening the sealing film of the stand-alone receiving container by providing opposing resistance to the sealing film in a peripheral region thereof so as to tear and laterally clear said sealing film during the screwing of the receiving container onto the connecting element, the assembled connecting element and receiving element forming an interior volume that constitutes a generally sealed and generally smooth and unobstructed passage between the interior of the receiving container and the interior of the stand-alone container after clearing the sealing film.

The present disclosure also provides the following optional features, taken in all technically compatible combinations:

the receiving element comprises a re-entrant flange capable of receiving and supporting an edge of the opening of the stand-alone container, whereas the sealing film is attached to said edge, said re-entrant flange delimiting an open space in the central region of the receiving element;

the device further comprises a cover adapted to be engaged on the receiving element to participate in retaining the stand-alone container;

with a stand-alone container whose edge around its opening forms a flat projecting edge, the cover includes an edge region capable of cooperating with said re-entrant flange of the receiving element to trap with pressure therebetween the flat projecting edge of the stand-alone container;

the cover is engaged on the receiving element by screwing, said edge region is formed by the free edge of the opening of a threaded cylindrical region of the cover;

said free edge of the opening of the cover has latching claws;

the cover is hinged on the receiving element, and comprises means for retaining the cover on the receiving element in a closed position;

the stand-alone container comprises, adjacent to its opening a screw thread for the screwing thereof on a receiving part of the receiving element;

the passage part is connected to a peripheral part of the connecting element by a linking part;

said linking part is formed by a continuous circumferential rib;

the opening member comprises a tooth formed on the passage part of the connecting element;

the edge of the passage part which is turned towards the receiving element is bevelled;

the opening member is formed in the apical region of the bevel;

the opening member is positioned in a projecting manner relative to the upper edge of the peripheral part of the connecting element;

said passage part is adapted for engagement in the receiving element so that the opening member gradually projects into a space of the receiving element receiving the stand-alone container during the screwing of the receiving element onto the connecting element;

said passage part forms two sealing skirts, one is adapted to cooperate with a neck of the container and the other is adapted to cooperate with another skirt formed on the receiving element;

the passage part of the connecting element has a generally cylindrical shape with a diameter slightly smaller than that of the interior space defined by the receiving element;

the passage part of the connecting element has a generally cylindrical shape and a diameter close to that of the opening, which is generally circular, of the stand-alone container, in order to tear the sealing film adjacent to the edge of the circular opening during movement of said stand-alone container when the receiving element is screwed onto the connecting element;

the device comprises means for limiting the screwing of the receiving element onto the connecting element so as to control the flight of the tearing movement of the sealing film by the opening member and prevent the total detachment of said sealing film; and the stand-alone container has a secondary protection element covering the sealing film in a manner separable therefrom.

The present disclosure further provides a connecting element adapted for attachment to the opening of a receiving container in order to form a device as defined above, the element comprising:

a screw thread for receiving a stand-alone container provided with a sealing film, either directly or via a receiving element for such a stand-alone container, a generally cylindrical, smooth, unobstructed and spout-forming passage part incorporating an element for opening the sealing film of the stand-alone container, the passage part is further adapted for sealingly pressing inside a neck of said receiving container.

Optionally, the connecting element includes/comprises two different screw threads for attachment by screwing to two different types of threaded necks of receiving containers.

According to a third aspect, there is provided an applicator device, comprising a connecting element having:

a portion for receiving an application material, a screw thread for receiving a stand-alone container provided with a sealing film, either directly or via a receiving element for such a stand-alone container, and with or without a retaining cover, a generally cylindrical, smooth, unobstructed passage part incorporating an element for opening the sealing film of the stand-alone container, the passage part being in communication with said application material receiving portion.

According to a fourth aspect, there is provided a stand-alone pod-type/capsule type container in particular for preparing beverages or preparations or mixtures, and in particular intended to be attached to the receiving element of a device as defined above, comprising a back, a sidewall ending as an opening closed by a sealing film, the container being provided at said side wall with a screw thread for its screwing attachment.

Optional features of the container, taken in any technically compatible combinations, are as follows:

the screw thread is external or internal.

the screw thread is provided adjacent to an opening of the container.

the container further comprises a removable cover for the protection of the sealing film.

the cover is temporarily attached to the container by screwing onto said screw thread.

Finally, there is provided a container, in particular a pod-type/capsule-type container, comprising an envelope sealed by a sealing film attached peripherally to a flat edge surrounding an opening of the container, the container further comprising a removable protective cover engaged by friction or form-fit connection around said flat edge.

Whatever the container as defined above, it is optionally provided with a secondary protective film covering the sealing film in a manner separable therefrom.

BRIEF DESCRIPTION OF THE DRAWINGS

Other features, aims and advantages will become more apparent upon reading the detailed description that follows, made with reference to the appended figures, given in a non-limiting way and in which:

FIG. 1A is an exploded view of an example of a first embodiment, with a cover, of a dispensing device according to the present disclosure screwed onto a bottle;

FIG. 1B is a sectional view along line A-A of FIG. 1A;

FIG. 2A is a side view in an assembled state of the embodiment of FIGS. 1A and 1B;

FIG. 2B is a sectional view along line B-B of FIG. 2A;

FIGS. 12 and 13 are a partially side view and partially view and partially axial sectional views of two variants of stand-alone containers that can be used with the embodiments of the present disclosure;

FIGS. 14 to 16 are axial sectional views of three other variants of stand-alone containers that can be used with the embodiments of the present disclosure;

DETAILED DESCRIPTION

Figure 3:
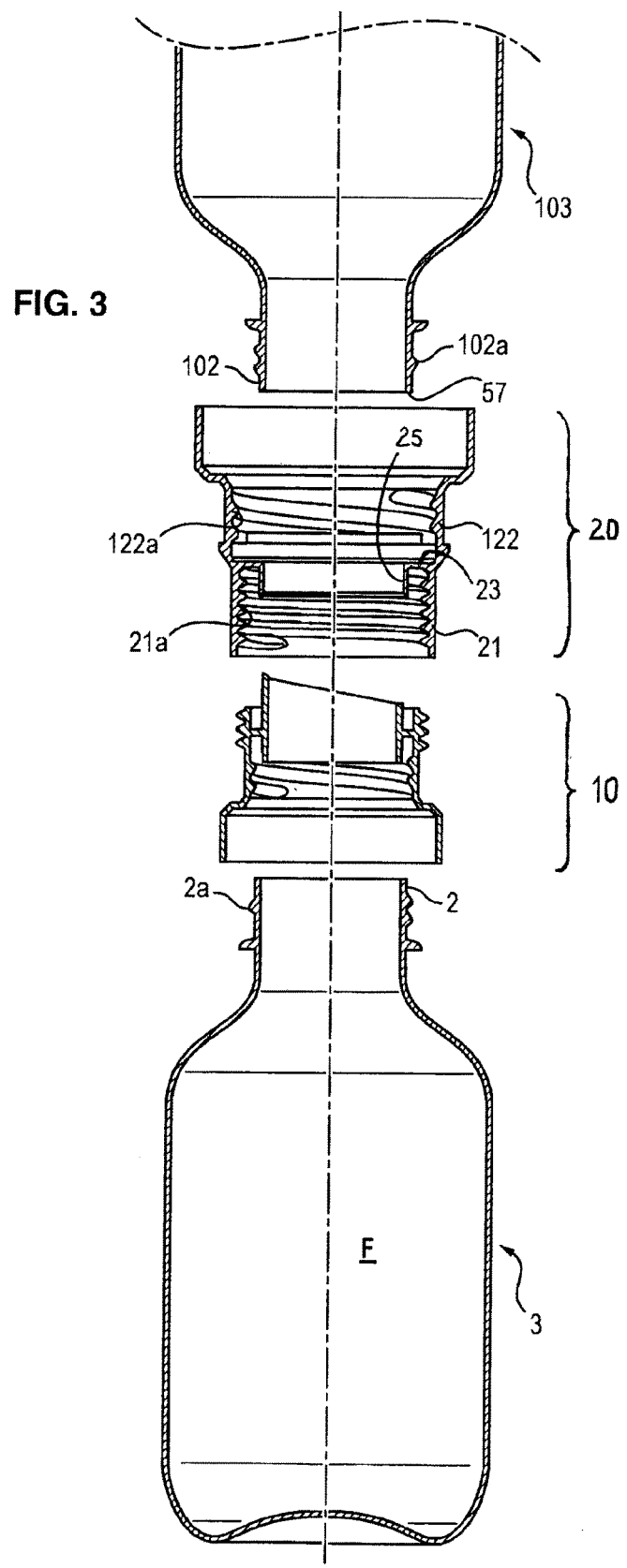
FIG. 3 is a partially sectional view of another embodiment, without a cover, of a dispensing device according to the present disclosure screwed on to a bottle and suitable for a stand-alone container provided with a thread, such as another bottle.

It will first be observed that identical or similar elements or parts will be denoted as far as practically possible by the same reference signs from one Figure to another.

Referring first to FIGS. 1A, 1B, 2A and 2B, a dispensing device 1 with a cover according to the present disclosure is suitable for attachment to an opening 2 of a receiving container 3. It may, for example, be screwed onto the neck 2 of a bottle 3, such as a water bottle, as illustrated in the figures. However, this example is not exhaustive since the dimensions and the attaching means of device 1 can be adapted to other types of receiving containers, including vials, jars, canisters and cans, for example, by screwing, latching, etc.

In this first embodiment, the device 1 is adapted to receive a container 50 which is stand-alone, i.e. manufactured separately and independently from device 1 and container 3.

The stand-alone container 50 is separately pre-filled with an add-on product P to be dispensed and mixed with the contents of the receiving container 3, such as a liquid or other fluid F, a powder or a mixture of these. It may, for example, be in the form of a capsule or a pod, and it is suitable for dosing, preserving and storing the add-on product(s) P separately and independently from device 1.

The stand-alone container 50 has a hollow space delimited by a back 52, a peripheral side wall 54 and a generally circular opening 55 opposite the back, which opening is surrounded by a flat peripheral edge 56, projecting radially outwardly, on the surface of which is peripherally attached, preferably by sealing, heat-sealing, etc. the closing film or seal 58 preferably made of an aluminum foil, a composite material or any other compatible materials. This sealing film may be protected by a removable protective member such as a detachable protection film covering film 58, a screw or snap-fit cap, a label or film made of a shrinkable material, and the materials for this element can be various (metal, plastic, paper or composite film, metallic or plastic cover, etc.). This protective member can also receive product or advertisement information, typically by printing.

The peripheral side wall has here a generally frustoconical shape, the opening 55 has a larger diameter than the back diameter 52.

However, this embodiment is not limiting, and other forms of capsule-type or other stand-alone containers 50 of varying and different sizes and volumes may be used with the dispensing device 1.

The stand-alone container may be made from plastic, a metal foil such as aluminum, cardboard, glass or else from a composite composition associating multiple materials by injection, thermoforming, injection/blow molding, etc. Biomaterials may also be used for all or part of the stand-alone container.

The dispensing device 1 for receiving such a capsule 50 has a main direction extending along a longitudinal axis X and comprises:
 a connecting element 10,
 a receiving element 20 for capsule 50,
 a hollow closing cover 30 (we will see later that this is optional) adapted to be adjusted on element 20, to form jointly therewith a receiving chamber 24 for capsule 50.

The connecting element 10 also has a passage part 40 that forms a spout one the one hand and that has an opening member 42 for puncturing, tearing and clearing the seal 58 of capsule 50 on the other hand.

The elements of the device may be made of plastic, e.g., by injection, each being integral.

The connecting element 10 can be attached to the neck 2 of bottle 3, in this case by an outer ring 11 whose lower region is threaded (at 12a) on its inner face 12 in a manner complementary to the threading 2a of neck 2. The upper region on the outer face 14 of ring 11 is threaded (at 14a) to participate in the engagement of receiving element 20 onto connecting element 10.

The passage part 40 of the connecting element 10 here is formed as a generally smooth and slightly frustoconical inner ring 40 connected to the outer ring 11 by a radial rib 19 extending at an intermediate height between the two rings. This ring 40 one the one hand forms a spout at its bevelled upper edge 13, which projects beyond the upper edge 18 of ring 11, and one the other hand contains a tool or member 42 for puncturing, tearing and clearing the seal 58 of capsule 50.

More specifically, the upper bevelled edge 13 of ring 40 is provided with a tooth 42 projecting upwards from the uppermost edge of said edge, as illustrated in FIG. 1A. As will be seen hereinafter, by means of its vertical wall 43, this tooth can peripherally cut said seal 58 and clear it outwardly during the screwing of the element 20 onto element 10. This tooth is indeed off-center relative to axis X, and the diameter of the ring 40 that bears it is preferably close to the diameter of the circular opening 55 of capsule 50.

It should be noted here that the parts 40a and 40b of the inner ring 40 respectively located below and above rib 19 both form thin sealing skirts intended to respectively cooperate with neck 2 and with a skirt 25 of the receiving element 20 as will be seen in more detail later. The outer surfaces of said skirts 40a, 40b are slightly tapered, narrowing towards their free end.

The rib 19 that joins connecting element 10 to the passage part 40 is continuous over its entire circumference and provides a sealing between the lower part and the upper part of the space located between the outer ring 11 and the inner ring 40 so as to participate in the sealing of the device.

In another embodiment, the cooperation between ring 40 and neck 2 (in the lower part) and between ring 40 and skirt 25 (in the upper part) can be performed sealingly (for example, by fitting the slightly tapered shapes into each other), and in this case, the rib 19 does not necessarily need to provide a sealing effect, in which case it may be discontinuous.

Alternatively, specific sealing means can be provided (e.g., integrated lip seals, added elastomeric rings) between ring 40 and neck 2 and/or between ring 40 and skirt 25 to provide this sealing.

The connecting element 10 further comprises at the base of outer ring 11 a skirt 15 that may be of cylindrical shape with circular or non-circular cross section, and have reliefs 16 to facilitate the handling of the connecting element 10 and its screwing onto the neck 2 of bottle 3.

Here, the skirt 15 is wider than ring 11 so as to define at their transition a generally radial shoulder 17.

It should be noted that the passage element 40 of the dispensing and mixing device 1, which permits the puncturing, tearing and folding of the capsule seal 58 by means of its opening member 42 and acts as an anti-drip spout, is in no way limited to the embodiment described herein of a mixing device comprising a receiving element and a cover, and can be adapted to any other dispensing device or cap or closing capsule.

The passage element 40 with its opening member 42 can be used to open the sealing films and seals of containers associated with other dispensing devices or caps or capsules for closing and opening a container, by adapting the connecting device with the passage element 40 so that its bevel carrying the opening member 42 is located either at the bottom, at the receiving container side, or at the top, at the stand-alone container side, or both at the bottom and at the top.

In the latter case, the device of the present disclosure can open and clear a seal both on the receiving container 3 and on the stand-alone container by means of two bevels and their respective teeth located at opposite ends of the passage element 40. It is clear that in such case, the configurations of the respective opening members can be different and adapted to the type and material of the seal or other closure film and to the type of container.

The receiving element 20 is of a general ring shape and is adapted to be screwingly engaged onto the thread 14a of ring 11 of connecting element 10. For this purpose, it comprises a base 21 with an internal thread 21a which is complementary to screw thread 14a. The base 21 extends upwardly into a receiving part 22 with a slightly wider outer diameter and provided with an internal thread 22a.

A re-entrant flange 23 extends on the inner side at the transition between base 21 and part 22.

The inner diameter of receiving part 22 is slightly larger than the overall diameter of the flat projecting edge 56 of capsule to allow said capsule to be positioned with said flat projecting edge 56 and the seal 58 pressed against re-entrant flange 23 and with a centering of the capsule circular opening 55 relative to the vertical longitudinal axis X. Preferably, the size of the surface of the re-entrant flange 23 is close to that of the flat projecting edge 56 of the capsule so as to support said capsule without encumbering its opening 55.

The flange 23 extends inwardly into a continuous, descending and generally cylindrical skirt 25 of axis X, intended to cooperate with the upper skirt 40b of ring 40 of element 10 as will be seen hereinafter. Furthermore, the inner edge 26 defined at the transition between flange 23 and skirt 25 is dimensioned so as to be coaxially aligned with the circular opening 55 of capsule 50 when the latter is positioned in element 20, so as to form a free passage for the distribution and circulation of the products between the opened capsule 50 and bottle 3 through the ring 40 of connecting element 10 when ring 40 is inserted into the empty space of base 21 and that of receiving part 22 at the flange 23 during the screwing of element 20 onto element 10.

Moreover, ring 40 and base 21 and the complementary threads 21a and 14a are dimensioned so that the beveled edge 13 of ring 40 crosses the space defined inside flange 23 and protrudes beyond it to reach the seal 58 of capsule 50 and open it at the circular opening 55 during the screwing of element 20 onto element 10, as will be seen hereinafter.

In this first embodiment, the device further comprises a closure element 30 forming a hollow removable cover defining with parts 22 and 23 of element 20 the receiving chamber 24 for the capsule, but having the main function of retaining capsule 50, axially and against rotation relative to receiving element 20, by blocking it against flange 23.

The cover 30 has here the general shape of a truncated hemisphere, and includes a single side wall 32 and a back 33, defining, together with receiving part 22 of receiving element 20, the receiving chamber 24 whose base is formed by flange 23. The cover 30 provides access to chamber 24 and enables the capsule 50 to be replaced after use.

The cover 30 and the receiving chamber 24, which are cylindrical with a circular cross-section in the illustrated embodiments, may have other shapes, such as a square or rectangular shape, etc. to accommodate a stand-alone container 50 of other shapes, such as a generally square or rectangular shape, etc.

The shape and size of the stand-alone container 50 are free and may be different from the shape and size of cover 30 and of receiving chamber 24, but this container must of course have height and/or width and volume dimensions that are smaller than those of receiving chamber 24 to permit to be received.

The side wall 32, here a single wall, has a cylindrical lower portion 31 provided with an external thread 31a capable of cooperating with thread 22a of element 20. The lower free edge opening 34 of this part further has latching claws 35 capable of engaging the surface opposing the seal of the flat edge 56 of capsule 50, thus contributing to blocking against rotation.

Alternatively, the cover 30 could also comprise pressing means extending vertically from the cover back 33, acting during screwing onto the upper part of the capsule body located at the side of the back 52, to apply its flat edge 56 against flange 23 while achieving the blocking against rotation.

According to another variant, a cover with a double wall may be provided, with an outer wall carrying a thread (internal or external) for screwing onto receiving element 20, and an inner wall adapted to retain the stand-alone container 50, while the free edge of this inner wall may or may not be equipped with gripping claws.

The external surface of wall 32 may be grooved (in 36) or otherwise arranged so as to facilitate its handling and screwing.

Preferably, all screwing actions are performed in the same direction so as to avoid the risk that a given screwing-on action induces the screwing-off of another of the screw arrangements.

The device is used by first placing a new capsule 50 in chamber 24 and by screwing the element 30 onto the element 20. At the end of this screwing-on, the claws 35 are gradually latched into the relatively malleable material of the flat edge 56 of capsule 50 and press said flat edge 56 against re-entrant flange 23, thereby allowing the capsule to be blocked against rotation and translation relative to element 20.

Further, the connecting element 10 is in turn engaged by screwing onto the neck of bottle 3. During this operation, the lower skirt 40a of ring 40 of the element 10 gradually engages in a sealing relation with the inner surface of neck 2.

Optionally, the general sealing can be enhanced by the pressure contacts between the top of neck 2 and rib 19 as well as at the l flat edge 56 of capsule, compressed between the lower edge of cover part 31 and flange 23.

Then, the assembly formed by elements 20 and 30 is screwed onto the connecting element 10 placed on bottle 3. During this screwing-on, ring 40 protrudes beyond flange 23 to engage the seal 58 and the skirt 25 of element 20 presses continuously against the outside of upper spout-forming skirt 40b of the ring 40 of element 10, here again in a sealing relationship.

This sealing is also ensured by the cooperation of the screw threads 31a, 22a and 21a, 14a when they come into abutment on flange 23 and shoulder 19.

Furthermore, the threads 14a and 21a of ring 1 and base 21 are dimensioned so that when a capsule 50 is placed in the receiving part 22 against the flange 23 of receiving element 20 and the latter is screwed onto connecting element 10, the capsule 50 is moved vertically downwardly while rotating, together with flange 23, towards connecting element 10 and against opening member 42 to allow their mutual engagement.

During this movement, the shape of tooth 42 enables seal 58 to be punctured and torn and folded. For this purpose, the vertical wall 43 of tooth 42 is adapted to clear the circular opening 55 of capsule 50 by folding the cut portion of seal 58 and also to clear the passage formed by ring 40, thus allowing the product contained in capsule 50 to be distributed and mixed with that in container 3 without the product being obstructed by seal 58.

More specifically, the vertical wall 43 of tooth 42 resists the pressure of seal 58 to tear and laterally fold seal 58 along an arc of a circle centered on axis X, until element 20 comes into abutment against connecting element 10.

It should be noted here that the screwing of element 20 onto element 10 should preferably be limited so that tooth 42 does not fully tear away the seal 58, which would then be capable of partially obstructing the communications passage between the interior of capsule 50 and the interior of bottle 3, or even fall to the bottom of the bottle. This limitation of the screwing-on action can be provided mainly through the flight and size of the thread 14a of ring 11 and the flight and size of the thread 21a of base 21, as well as the height of the skirt 25 and the dimensioning of the abutment-forming shoulder 19 and 23, so as to obtain the degree of rotation permitting the seal 58 to be cut without having it completely detached from capsule 50, either by the abutment of the top of ring 11 against the underside of flange 23, or by the abutment of the base of element 20 against the shoulder 17 of element 10.

The lower part of flange 23 also serves as an abutment during the screwing of the internal thread 21a of base 21 onto the external thread 14a of ring 11, thereby limiting the rotation of the opening member 42 of ring 40 relative to element 20 in order to cut the seal 58 sufficiently to open capsule 50 and allow access to its contents, but, as mentioned, without completely cutting it so that it remains attached to capsule 50 without risking to fall into receiving container 3.

Preferably, the angular flight of tooth 42 relative to the seal in its seal-tearing movement extends over an angle of approximately 180 to 340°.

It can be observed that at the end of these operations, a generally cylindrical, generally smooth and generally sealed and unobstructed interior passage space has been formed between the inside of capsule 50 and the inside of bottle 3, which ensures an excellent distribution of the dose contained in capsule 3 towards bottle 3 and vice versa.

In use, the dispensing and mixing device 1 of the present disclosure may be implemented according to the following process:

a) inserting a new capsule 50 in the receiving part 22 of receiving chamber 24 of element 20, by positioning the outer edge 56 provided with seal 58 against flange 23, b) closing element 20 with the removable hollow cover 30, by screwing or snap-fitting, so as to close chamber 24 and lock the capsule 50 in a sealed manner against flange 23, c) screwing the connecting element 10 onto the neck 2 of bottle 3, d) screwing the assembly of element 20 closed by the cover 30 onto connecting element 10 up to the abutment.

The cover 58 is then cut by the opening member 42 of ring 40, but remains attached to capsule 50, and the product P contained therein falls by gravity into bottle 3. In order to recover all of product P and thoroughly mix it with the contents of bottle 3, the bottle 3 provided with the dispensing and mixing device should merely be flipped or shaken several times so as to fill capsule 50 with the fluid F contained in bottle 3.

After distribution and mixing, the mixture contained in bottle 3 can be used after removing by unscrewing the assembly made of parts 10, 20 and 30 containing capsule 50. Alternatively, if only parts 20 and 30 are removed, part 40 still present in the vicinity of the neck of bottle 3 can act as anti-drip spout.

According to an alternative embodiment, the cover 30 can be engaged with element 20 by other means than screwing, and particularly by snap-fitting, whereas the cover can be distinct from element 20 or formed integrally therewith (e.g., connected thereto by a film hinge).

Figure 4:
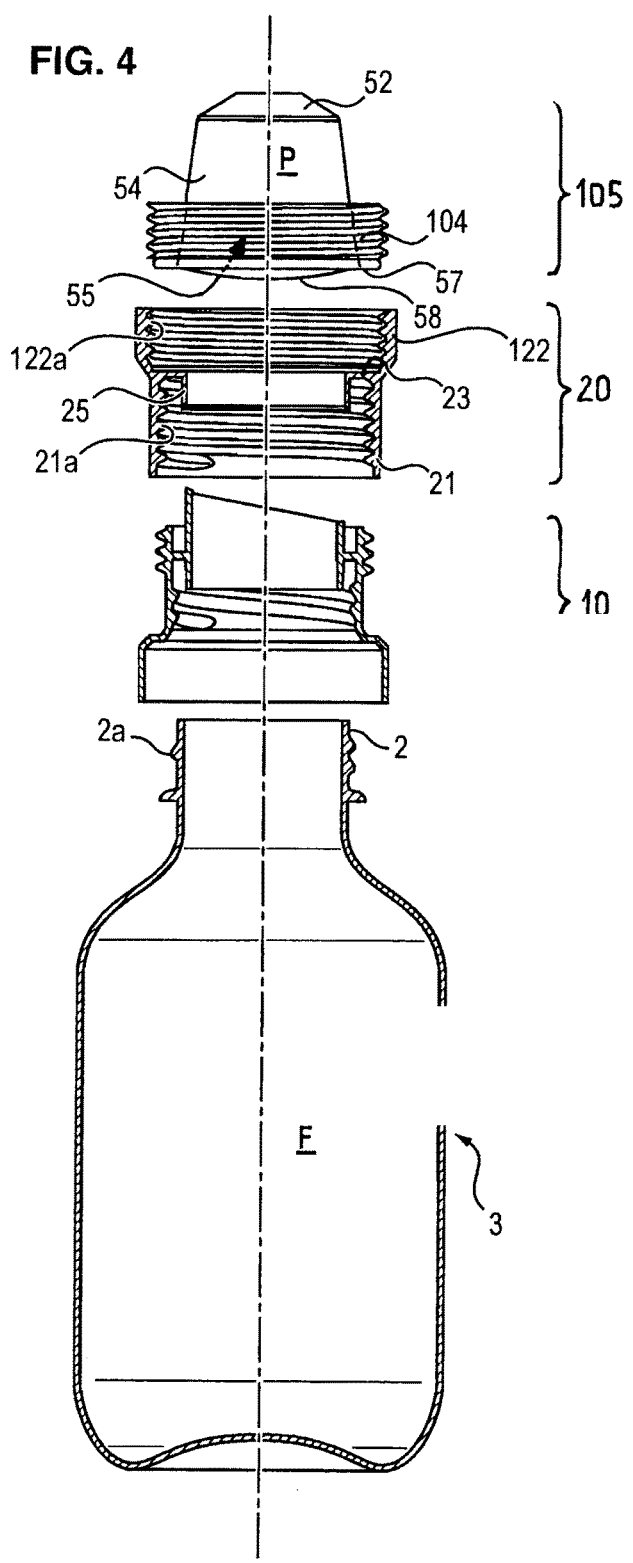
FIG. 4 is a partially sectional view of another example of an embodiment, also without a cover, of a dispensing device screwed onto a bottle and suitable for a threaded pod-type capsule.
Figure 5:
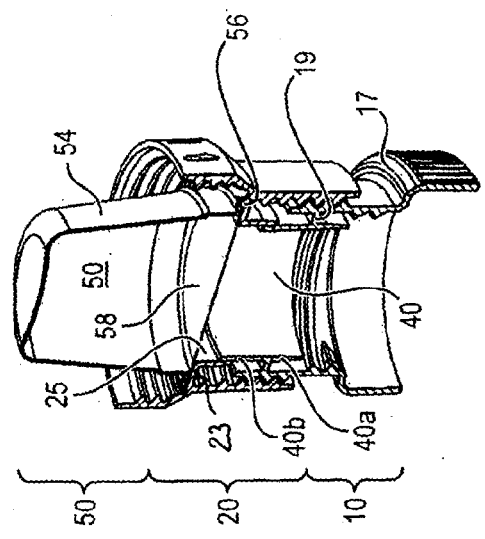
FIGS. 5 to 11 are broken-away perspective views taken from different angles of certain parts of the dispensing device according to the first embodiment.
Figure 6:
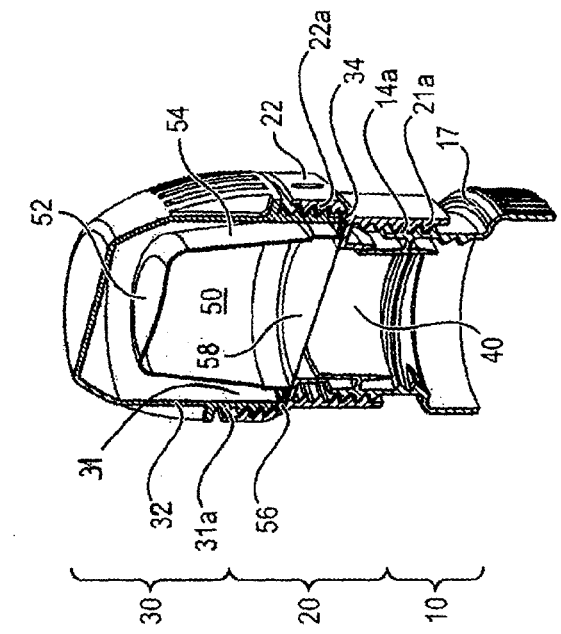
Figure 7:
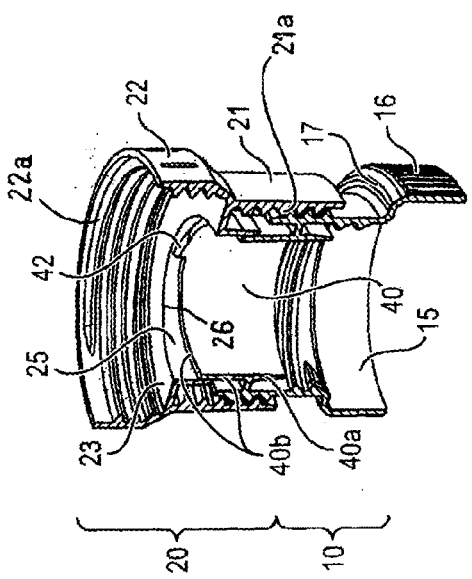
Figure 8:
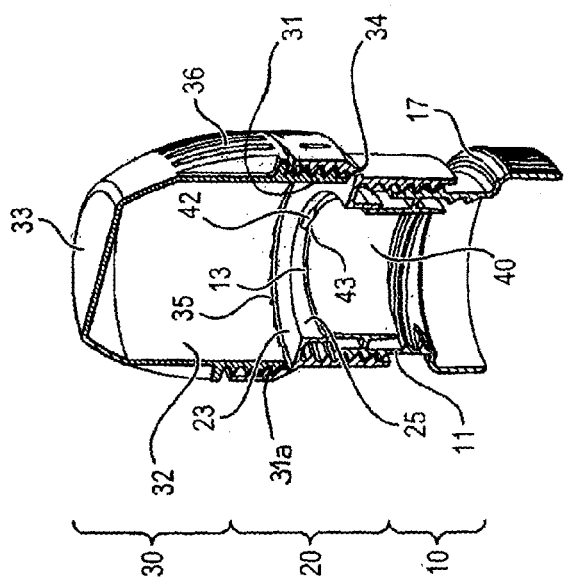
Figure 9:
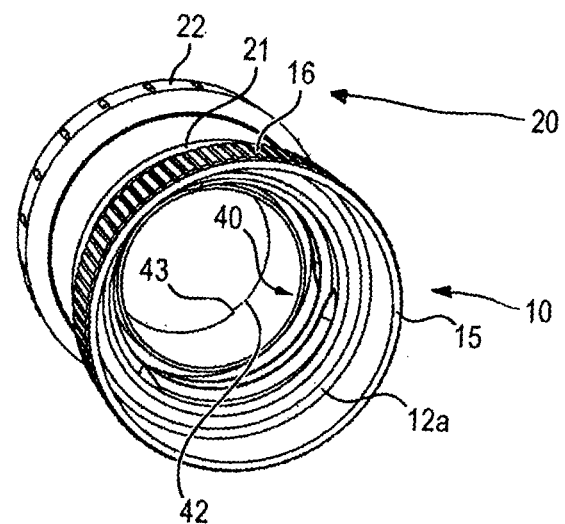
Figure 10:
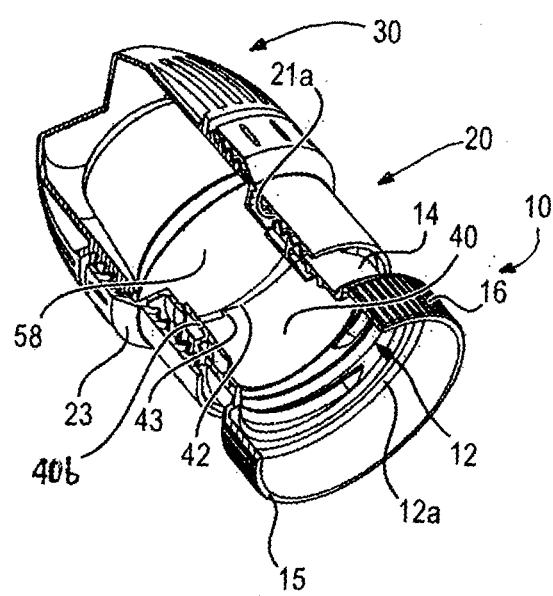
Figure 11:
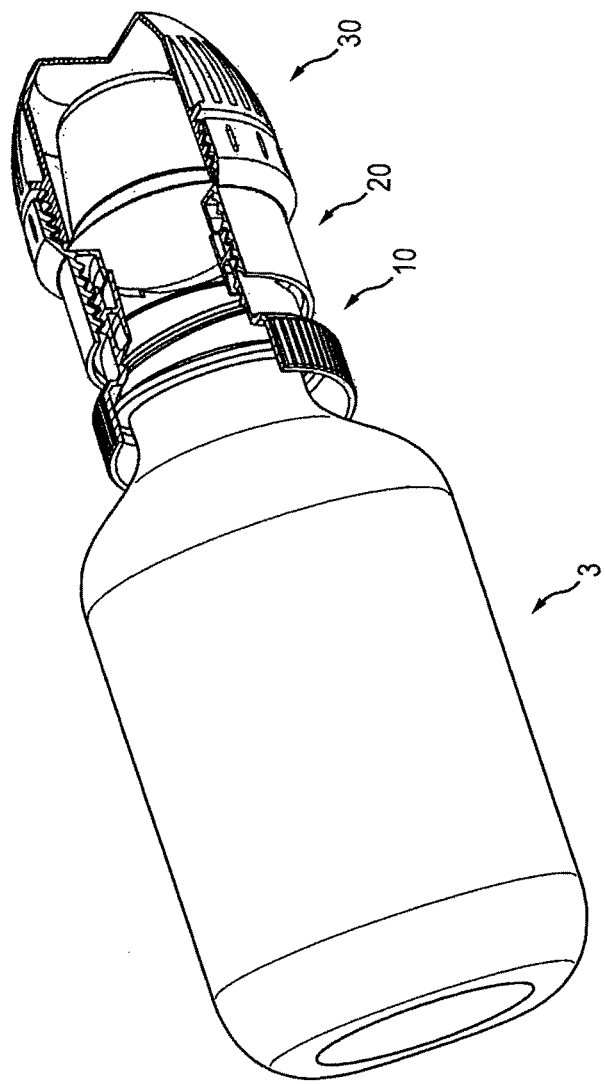

According to another embodiment, and now referring to FIGS. 3 and 4, the dispensing device 1 may be designed to be used without the use of a cover 30, the receiving element 20 is adapted to receive, instead of a capsule held in a pressing relation by a cover on its projecting flat edge in flat contact with a flange, another form of stand-alone container, in this case provided with a screw thread, such as another bottle with a screw neck (FIG. 3) or a screwable pod-type capsule (FIG. 4) that, here again, has an opening initially closed by a seal (not shown in FIG. 3), or more generally, any stand-alone sealed container with a complementary screw thread compatible with the one provided on element 20.

The base 21 of element 20, including flange 23 and skirt 25, are here identical to those described with reference to the first embodiment.

However, with reference to FIG. 3, the upper receiving part, denoted 122, of the element 20, is here adapted to receive by screwing the screw neck 102, sealed and provided with a thread 102a, of a bottle 103, and to this end comprises a complementary internal thread 122a. The surface of the free edge 57 of the neck opening that carries the seal 58 may then, at the end of the screwing process, come to bear in a generally sealed manner against re-entrant flange 23.

Once this operation is achieved, the device generally behaves identically to what has been described previously when the assembly formed by bottle 103 and receiving element 20 is screwed onto the connecting element 10 (identical to that described above) previously screwed onto bottle 3.

In the embodiment of FIG. 4, the stand-alone container 105 may be provided with a thread 104 on the outer side wall 54, near the circular opening 55 whose free edge surface 57 can be receive the seal 58.

The upper receiving element 122 of element 20 is then adapted to receive by screwing the sealed and screwthreaded pod-type capsule 105 as described above and comprises to this end a complementary internal thread 122a.

By this connection means, the stand-alone container 105 may be screwed directly onto the dispensing and mixing device 1, the screw thread 104 and the surface of the free edge of opening 57, constituting the termination of side wall 54, then ensuring, once screwing-on is complete, the sealing by pressure bearing against flange 23.

Once this operation is achieved, the device generally behaves identically to the one described above.

It should be noted that in the embodiments of FIGS. 3 and 4, the threads of all the elements are involved in the sealing of the upper part of the dispensing and mixing device 1 at the reception part 122 and the flange 23.

It should be further noted that, according to these embodiments, the upper part of the dispensing and mixing device 1 is open. As the receiving chamber 24 and the cover 30 do not exist any longer, it is therefore capable of receiving any type of sealed stand-alone container 50 equipped with a suitable threading complementary to that of receiving element 20. In this case, the upper receiving part 122, open, can advantageously receive a film or protection cover attached to its free edge, especially to protect flange 23 and the other parts from contamination during the handling and storage of the device.

According to another, non-illustrated variant, it may be provided that the thread is arranged on a downward extension of the stand-alone container, whereas the sealing film is attached in a location set back from said extension, either on a re-entrant flange arranged on the stand-alone container, or on the free edge of an inner wall of the container, extending along its outer wall. In this case in particular, the thread of the stand-alone container may be external or internal.

FIGS. 12 to 16 show different variants of a stand-alone container that can participate in the present disclosure.

First, FIG. 12 illustrates an alternative embodiment of the stand-alone container 105 with threaded base of FIG. 4, wherein a cover 70 has a central part 71 and an axial peripheral flange 72 threaded internally at 72a for temporary screwing engagement onto the thread 104 of container 105.

This embodiment is interesting in that it allows protecting the container 105 and its seal 58 during transport and handling, avoiding an accidental puncturing of seal 58. It is applicable when the product contained in the container has a pharmacological or chemical specificity requiring a higher degree of protection, and/or when it is desired to avoid contamination of the seal 58 by the external environment, etc.

FIG. 13 illustrates an alternative embodiment of the container 50 (non-threaded version) made in the same spirit, where the container is of the conventional type with a flat projecting edge 56 on which the seal 58 is attached. The cover 70 has in this case a central part 71 and a peripheral axial flange 72 that can engage said edge 56 in a retaining manner.

Advantageously, this flange has internally, throughout its length, a groove 72b that can receive the outer region of the projecting flat edge 56 to achieve good retention of the cover. The cover is, in this case, made of a material (preferably synthetic) sufficiently flexible to be removed.

FIG. 14 in turn illustrates an embodiment in which the stand-alone container, denoted 60, is made in an identical or similar way to the cover 30 of the embodiment of FIGS. 1A, 1B and 2A, 2B. It is understood that this embodiment, which essentially consists in replacing the capsule 50 with the envelope of a part that was previously a cover, allows to provide a larger volume for the product to be mixed.

The container 60 includes a generally cylindrical lower part 61 which is externally threaded in 61a near its free edge 67 surrounding its opening, a side wall 62 and a back wall 63, all defining an interior space 64. Arrangements can also be provided to facilitate gripping and rotation, such as a corrugated or grooved upper region 66. Like for the container 50 of the previous embodiments, the container 60 is closed by a seal 68 that can be torn by the opening member 42 in the same manner as described above.

This seal is attached in this case by adhesion, in a conventional manner, to the generally flat free edge 67.

If necessary, the geometry (in particular the diameter) of the passage part 40 carrying element 42 can be adjusted, since the opening of the container 60 is slightly larger than the one of the previously described container 50.

FIG. 15 illustrates an alternative embodiment of FIG. 14 in which the container 60 is closed by a double seal or another double film, namely the aforementioned closing seal 68 and, above this, a protective seal 69 provided with a lateral tab 69a allowing to remove it manually prior to using the container with the device of the present disclosure. This improvement prevents contamination by external agents of the seal 68 which will come into contact with the final product when operating the device. It should be noted that this double sealing can also be applied to a threadless pod-type capsule 50, or to a threaded capsule 105, and more generally to any stand-alone container suitable for use with the device of the present disclosure.

FIG. 16 in turn shows another variation wherein the container 60, generally identical to that of FIG. 14, is completed with a protective cover 70 basically identical to the cover 70 of FIG. 12, once again so as to avoid contaminating the seal before use.

Other means allowing to protect the seal 58 or 68 and possibly other parts of the stand-alone container 50, 60, 103 or 105 may be implemented, in addition to or in replacement of the solutions described above, including the use of a removable protection film covering the film 58, a snap-fit cover, a label or a film in shrinkable material, the materials for this protection element being various (e.g., metal foil, plastic, paper or composite, metallic or plastic cover) and adapted to needs.

The container of FIGS. 14-16, by virtue of its larger capacity, may be particularly suitable for applications such as the preparation of baby bottles for babies, whereas the container 60 contains a dose of powdered infant formula suitable for a given quantity of water previously poured into the final container 3 (a baby bottle) and brought to the proper temperature.

After implementing the device of the present disclosure, the device of the present disclosure merely needs to be unscrewed and replaced with a nipple.

Figure 17A:
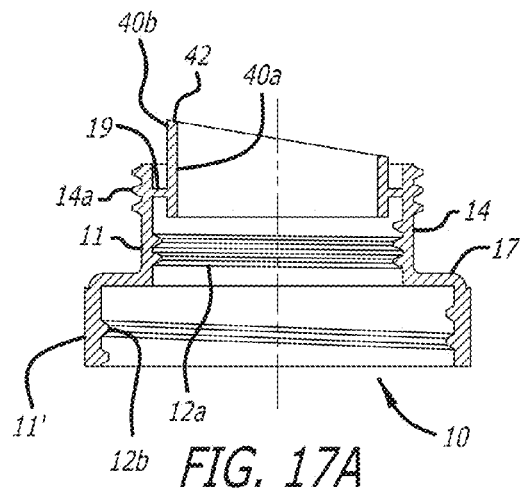
FIG. 17A is an axial sectional view of a connecting element according to a variant of the present disclosure.
Figure 17B:
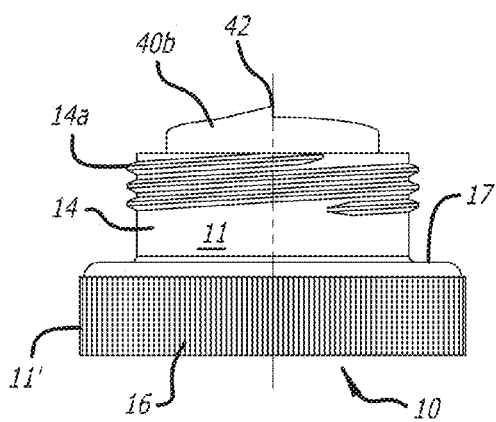
FIG. 17B is a side view of the connecting element of FIG. 17A.

Referring now to FIGS. 17A and 17B, a connecting element 10 according to a variant embodiment of the present disclosure is designed for adaptation to different types of receiving containers 3. To this end, the outer ring 11 comprises a first internal screw thread 12a complementary to a first type of receiving container threading, and an expansion 11' of said outer ring, having a larger diameter than ring 11 and located opposite the external thread 14a in the axial direction, comprises a second internal screw thread 12b complementary to a second type of receiving contained threading.

In such manner, one same connecting element can be used with different types of receiving container. In an improvement (not shown), more than two threading type could be provided.

For the rest, the connecting element 11 preferably has a structure identical or similar to the one shown in FIGS. 1-4.

Figure 18:
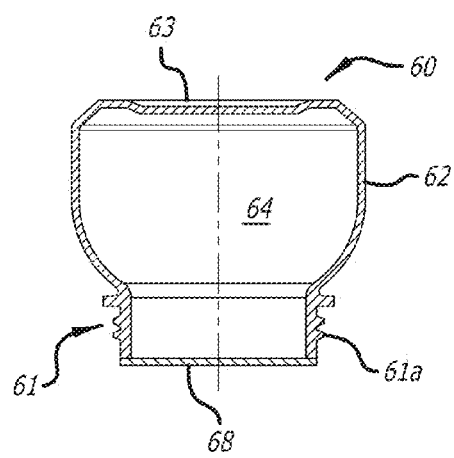
FIG. 18 is an axial sectional view of a stand-alone container according to another variant embodiment.

FIG. 18 shows a variant of the stand-alone container 60 provided with an external threading as shown in FIG. 14, with a however a larger capacity by having a side wall 62 expanded compared to the cross-section of the threaded region. This allows increasing the volume capacity of the stand-alone container, for applications such as baby milk powders or other nutrition products where the standard dose has a significant volume.

Such stand-alone container 60 is preferably made by injection blow molding or extrusion-soufflage/extrusion blow molding.

Figure 19:
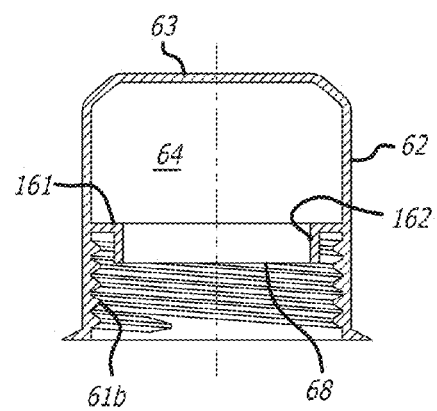
FIG. 19 is an axial sectional view of a stand-alone container according to still another variant embodiment.

FIG. 19 shows another variant of the threaded stand-alone container. In this variant, the outer screw thread 61a of the container shown in FIGS. 14 and 18 is replaced by an inner screw thread 61b, and the sealing film 68 is located in a recessed position upwardly relative to the open end (bottom end in FIG. 19) of the container 60.

More particularly, the container 60 comprises at an intermediate height a re-entrant flange 161 from the inner edge of which extends downwardly a generally cylindrical skirt 162 having a bottom annular free edge on which the seal 68 is attached.

Such stand-alone container 60 is adapted to cooperate directly with a connecting element such as the one shown in FIG. 1-4 or 17A-17B, in which case the receiving element 20 is omitted, the device of the present disclosure comprising in this case only two parts, i.e. the connecting element 10 and a disposable stand-alone container, thus limiting the number of parts and facilitating the overall handling of the device.

Figure 20:
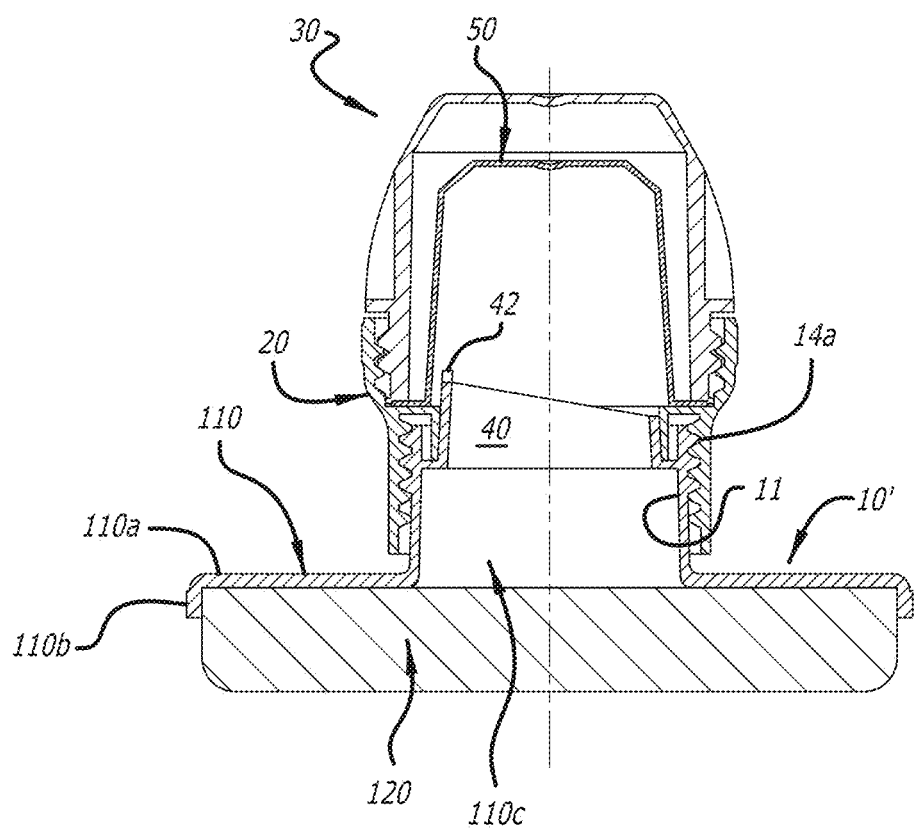
FIG. 20 is an axial sectional view of a device, according to the present disclosure, adapter for another use than mixing products.

Now referring to FIG. 20, a variant embodiment of the present disclosure is described, where the receiving container 3 of the previous embodiments is replaced with an applicator for directly applying the contents of a stand-alone container to a surface.

To this end, the device comprises a connecting element 10' including, in replacement of the screw thread 12a and/or 12b for screwing onto a bottle or the like, an applicator part 110 comprising a generally flat surface 110a and a peripheral flange 110b extending downwardly in the Figure.

An application material 120 such as a foam, a cloth, a sponge, brush, etc., or any combination thereof, is secured to the applicator part e.g. by an adhesive, by a peripheral rim (not shown) which can be snap-fit to part 110 and which is for instance connected thereto by a film hinge, etc.

The connecting element comprises in its upper region the same arrangements as in the previous embodiments, i.e. mainly an outer face 14 of the (smooth) ring 11 threaded at 14a, and the passage part 40 with its tooth arrangement. The passage part 40 communicates with the application material 120 via an opening 110c provided in the central region of part 110, where ring 11 is defined.

The applicator device further comprises a receiving element 20 and a cover 30 adapted to receive a disposable stand-alone container 50, e.g. as previously described.

The device can be used, by placing a new stand-alone container in a locked position in the cavity defined by elements 20 and 30, and by then screwing such assembly onto element 10', whereby the sealing film 58 of container 50 is torn and cleared by the tooth 42 is the same manner as previously described.

The liquid content of container 50 can then circulate through the passage part 40 to the applicator material 120 which is saturated by said liquid.

The device can then be applied to a surface to apply the liquid thereto in a regular manner by means of the applicator material.

The applicator can cooperate with a stand-alone container in any of the matters described above in relation with bottles.

In particular, the applicator can be used with a device without a cover 30, i.e. with a threaded stand-alone container provided with a screw thread e.g. as previously described in relation with FIGS. 14 to 16 and 18,19.

Alternatively, the applicator may comprise in its central region an arrangement similar to the neck 2 of bottle 3, with a screw thread for screwingly attaching applicator to a connecting element 10 like in FIGS. 1-4.

This embodiment has a very large variety of applications, and in particular cosmetics, skin medication, surface cleaning, surface treatment, painting or varnishing, etc.

The present disclosure has many potential applications and advantages, as explained below.

Firstly, in the embodiments including a receiving container 3, thanks to the sealing achieved between the two containers, and to a direct, unobstructed path between their internal spaces after the mechanical opening of the seal, it is possible to use a device according to the present disclosure to prepare dosages requiring high precision, e.g. when diluting a medication in a solvent. A capsule 50 would contain, for example the medication to be mixed and the bottle 3 would contain water or any solvent that may serve as a medium for ingestion.

It is also possible to use the device of the present disclosure for mixing hazardous chemicals with great safety, without risk of contact or inhalation during the mechanical opening of the seal and the mixing of the products.

It is also possible to use the device of the present disclosure to associate and mix one or more dry (typically in powder or granular form), semi-liquid or liquid concentrated products contained in the stand-alone container 50, 60, 103 or 105, such as detergents, syrups or alcohols, with a liquid contained in the receiving container 3, such as water, to obtain with the present disclosure a dilution of the concentrated products.

Generally speaking, the device of the present disclosure provides a secure and hygienic way to open the seals of sealed containers without direct manual contact and allowing to prepare the mixtures without the risk of direct contact with the products contained in the stand-alone container 50, 60, 103, 105 and receiving container 3.

It is further possible to successively deliver the doses of several capsules 50 of a same product P or different products P1, then P2, then P3, etc. into one same bottle 3 by replacing the used capsule with a new capsule.

To this end, element 20 should merely be unscrewed from element 10, either totally or partially, to sufficiently release tooth 42 and return it well below flange 23, then the cover 30 should be unscrewed to remove the used capsule and replace it with a new capsule, then the cover 30 should be screwed again, and then the element 20 should be screwed again onto the element 10 up to the screwing abutment, to tear and laterally clear the seal 58 of the new capsule and deliver the product(s) P.

In a similar manner, in the applicator embodiment, two or more doses of a product (or different products) can be successively applied to a surface via the application material 120.

In the event that the dispensing device is used without a cover and with threaded pod-type capsules 105 or other threaded stand-alone containers such as 60, the element 20 should merely be unscrewed from element 10, either totally or partially, to sufficiently release tooth 42 and return it well below flange 23, then the used threaded container should be unscrewed to remove it and replace it with a new threaded container and screw it onto element 20, and element 20 should be screwed again onto the element 10 up to the screwing abutment to tear and laterally clear the seal of the new threaded container and deliver the product(s) P.

The dispensing and mixing device 1 permits the immediate use or consumption of products, said products are dosed, preserved and stored in stand-alone containers hermetically closed with a seal, which allows the products to keep their intrinsic properties and their active ingredients intact without degradation until the moment of use with the dispensing and mixing device for opening the seal and performing a single or multiple mixture only at the moment of use and thus allow, by virtue of the present disclosure, an immediate and instantaneous use according to the needs of the moment.

It should further be noted that the present disclosure can be used with a wide variety of containers. Thus, while embodiments in which the stand-alone container is a flat-edged capsule or a threaded capsule, or a threaded neck bottle have been described above, one could for example use a capsule or other container incorporating around its periphery a screw thread, snap-fit means, etc.

Of course, many variations and modifications may be made to the embodiments of the present disclosure.

In particular, one will be able to adapt the shape and dimensions of the different elements as a function of different requirements (container or capsule types, seal types and their thicknesses and materials, etc.).

The device is designed to be reusable and provide a single mixture or multiple mixtures, but the dispensing and mixing device may also be made and used as a disposable, single-use and pre-assembled device with a stand-alone container and a receiving container, in which case it may include one or more detachable tamper-proof rings; in particular, an external detachable tamper-proof ring (not shown) may be incorporated between the bottom of base 21 of element 20 and the shoulder 17 of element 10, another detachable tamper-proof ring (not shown) may be placed between the upper outer edge of receiving part 22 and the lower, threaded outer edge of cover 30 or of the stand-alone container 103 or 05, and another detachable tamper-proof ring (not shown) may also be placed between the base of skirt 15 of element 10 and the neck 2 of receiving container 3.

Another way to ensure a tamper-proof safety prior to single use or first use is to employ a shrinkable and detachable plastic film sleeve positioned on the whole pre-assembled device.

This dispensing and mixing device can be employed for using and/or consuming various products: nutritional supplements, drugs, in particular extemporaneous medical preparations, cosmetics, food products such as baby formula, sterilized preparations, lyophilized products, cleaning products, chemicals, and more generally any natural or synthetic products.

Furthermore, the present description extends to any original combination of features, and in particular:

the general combination of a disposable sealed pod-type capsule including a threaded attachment mechanism and of a receiving element with an complementary screw thread; this receiving element may be either of the type described above or integrated into an automatic beverage preparation or product mixture machine using the contents of the capsule, such as a coffee machine, a beverage preparation machine or a mixing machine;

the puncturing and peripheral tearing of the seal of a container during the screwing together of two elements, one carrying the container and the other carrying a puncturing and tearing element;

the general combination of a spout function and a seal-tearing function when bringing together by screwing an element which on the one side forms a spout and on the other side includes an opening member 42, and another element carrying the sealed container, where this combination may be either of the type described above or integrated into an automatic beverage preparation or product mixing machine.

The invention claimed is:

1. A mixing and dispensing device adapted for attachment to an opening of a receiving container, and intended to receive a stand-alone container having an opening sealed with a sealing film and containing an add-on product to be dispensed into the interior of the receiving container containing another product, the device comprising:

a receiving element adapted to receive and retain the stand-alone container at its opening; and a connecting element adapted for attachment to the opening of the receiving container and for receiving said receiving element by screwing, said connecting element having a smooth and unobstructed passage part adapted for engagement into a homologous part of said receiving element, said passage part having a free edge incorporating an opening member for opening the sealing film of the standalone receiving container by providing opposing resistance to the sealing film in a peripheral region thereof so as to tear and laterally clear said sealing film during the screwing of the receiving element onto the connecting element and the resulting rotational component therebetween, the assembled connecting element and receiving element forming an interior volume that constitutes a sealed, smooth and unobstructed passage between the interior of the receiving container and the interior of the stand-alone container after clearing the sealing film, said free edge of the passage part forming a pouring spout for the receiving container after said stand-alone container has been removed.

2. The device according to claim 1, wherein the receiving element comprises a re-entrant flange capable of receiving in a pressing relation an edge of the opening of the stand-alone container, the sealing film being attached to said edge, said re-entrant flange delimiting an open space in the central region of the receiving element.

3. The device according to claim 1, further comprising a cover adapted to be engaged on the receiving element to participate in retaining the stand-alone container.

4. The device according to claim 3, wherein the stand-alone container has an edge around its opening forming a flat projecting edge, and wherein the cover includes an edge region capable of cooperating with said re-entrant flange of the receiving element to trap with pressure therebetween the flat projecting edge of the stand-alone container.

5. The device according to claim 4, wherein the cover is engaged on the receiving element by screwing, said edge region being formed by the free edge of the opening of a threaded cylindrical region of the cover.

6. The device according to claim 5, wherein said free edge of the opening of the cover has latching claws.

7. The device according to claim 4, wherein the sealing film of the stand-alone container is attached peripherally to said flat projecting edge, and the stand-alone container further comprises a removable protective cover engaged by friction or form-fit connection around said flat edge.

8. The device according to claim 7, wherein the stand-alone container further comprises a secondary protective film covering the sealing film in a manner separable therefrom.

9. The dispensing device according to claim 1, wherein the cover is hinged on the receiving element, and comprises means for retaining the cover on the receiving element in a closed position.

10. The device according to claim 1, wherein the stand-alone container comprises, adjacent to its opening a screw thread for the screwing thereof on a receiving part of the receiving element.

11. The device according to claim 10, wherein the screw thread is external.

12. The device according to claim 10, wherein the screw thread is internal.

13. The device according to claim 10, wherein the stand-alone container further comprising a removable cover for the protection of the sealing film.

14. The device according to claim 13, wherein the removable cover is temporarily attached to the stand-alone container by screwing onto said screw thread.

15. The device according to claim 1, wherein the passage part is connected to a peripheral part of the connecting element by a linking part.

16. The device according to claim 15, wherein said linking part is formed by a continuous circumferential rib.

17. The device according to claim 1, wherein the opening member comprises a tooth formed on the passage part of the connecting element.

18. The device according to claim 1, wherein the edge of the passage part which is turned towards the receiving element is bevelled.

19. The device according to claim 18, wherein the opening member is formed in the apical region of the bevel.

20. The device according to claim 1, wherein the opening member is positioned in a projecting manner relative to the upper edge of the peripheral part of the connecting element.

21. The device according to claim 1, wherein said passage part is adapted for engagement in the receiving element so that the opening member gradually projects into a space of the receiving element receiving the stand-alone container during the screwing of the receiving element onto the connecting element.

22. The device according to claim 1, wherein said passage part forms two sealing skirts, one being adapted to cooperate with a neck of the container and the other being adapted to cooperate with another skirt formed on the receiving element.

23. The device according to claim 1, wherein the passage part of the connecting element has a cylindrical shape with a diameter slightly smaller than that of the interior space defined by the receiving element.

24. The device according to claim 1, wherein the passage part of the connecting element has a cylindrical shape and a diameter close to that of the opening, which is circular, of the stand-alone container, in order to tear the sealing film adjacent to the edge of the circular opening during movement of said stand-alone container when the receiving element is screwed onto the connecting element.

25. The device according to claim 1, comprising means for limiting the screwing of the receiving element onto the connecting element so as to control the flight of the tearing movement of the sealing film by the opening member and prevent the total detachment of said sealing film.

26. The device according to claim 1, wherein the stand-alone container has a secondary protection element covering the sealing film in a manner separable therefrom.

27. A connecting element adapted for attachment to the opening of a receiving container, comprising:
  a screw thread for receiving a stand-alone container provided with a sealing film, either directly or via a receiving element for such a stand-alone container; and
  a cylindrical, smooth, unobstructed and spout-forming passage part incorporating an element for opening the sealing film of the stand-alone container, the passage part being further adapted for sealingly pressing inside a neck of said receiving container.

28. The connecting element according to claim 27, comprising two different screw threads for attachment by screwing to two different types of threaded necks of receiving containers.

29. An applicator device, comprising a connecting element having:
  a portion for receiving an application material;
  a screw thread for receiving a stand-alone container provided with a sealing film, either directly or via a receiving element for such a stand-alone container; and
  a cylindrical, smooth, unobstructed passage part incorporating at a free edge thereof an opening member for opening the sealing film of the stand-alone container by providing opposing resistance to the sealing film in a peripheral region thereof so as to tear and laterally clear said sealing film during the screwing of the stand-alone container or its receiving element onto the connecting element and the resulting rotational component therebetween, the passage part being in communication with said application material receiving portion.

30. A connecting element provided on the opening part of a receiving container, comprising:
  a screw thread for receiving at least one type of a stand-alone container provided with a sealing film, either directly or via a receiving element for such a stand-alone container; and
  a cylindrical, smooth, unobstructed passage part incorporating at a free edge thereof an opening element for opening the sealing film of the stand-alone container by providing opposing resistance to the sealing film in a peripheral region thereof so as to tear and laterally clear the sealing film during the screwing of the stand-alone container or its receiving element onto the connecting element and the resulting rotational component therebetween, the passage part forming a sealed, smooth and unobstructed passage between the interior of the assembled stand-alone container or its receiving element after clearing the sealing film and the interior of the receiving contained, and the passage part forming a pouring spout for the receiving container after the stand-alone container or its receiving element has been removed.

* * * * *